US011308342B2

(12) United States Patent
Iwamoto (10) Patent No.: US 11,308,342 B2
(45) Date of Patent: Apr. 19, 2022

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kazunari Iwamoto, Kariya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 16/449,000

(22) Filed: Jun. 21, 2019

(65) Prior Publication Data

US 2020/0005066 A1  Jan. 2, 2020

(30) Foreign Application Priority Data

Jun. 27, 2018 (JP) .............................. JP2018-122422

(51) Int. Cl.
*G06K 9/32* (2006.01)
*G06T 7/215* (2017.01)
*G06T 7/11* (2017.01)
*H04N 5/232* (2006.01)

(52) U.S. Cl.
CPC .............. *G06K 9/3233* (2013.01); *G06T 7/11* (2017.01); *G06T 7/215* (2017.01); *H04N 5/23229* (2013.01); *H04N 5/232945* (2018.08); *G06T 2207/30242* (2013.01)

(58) Field of Classification Search
CPC ......... G06K 9/3233; G06T 7/11; G06T 7/215; G06T 2207/30242; H04N 5/23229; H04N 5/232945

USPC ........................................................ 382/103
See application file for complete search history.

(56) References Cited

U.S. PATENT DOCUMENTS

| 7,176,441 | B2 * | 2/2007 | Sumitomo | ............ G06M 1/101 |
| | | | | 250/221 |
| 9,569,902 | B2 * | 2/2017 | Shibuya | ............. G06K 9/00778 |
| 2015/0278588 | A1 * | 10/2015 | Matsumoto | ........ G06K 9/00348 |
| | | | | 382/103 |
| 2016/0224829 | A1 * | 8/2016 | Chou | ........................ G06T 7/11 |

FOREIGN PATENT DOCUMENTS

WO     2017/115060 A1    7/2017

OTHER PUBLICATIONS

Jae-Won Kim, et al.; "Real-Time Vision-Based People Counting System for the Security Door;" International Technical Conference on Circuits Systems, Computers and Communications, pp. 1418-1421, 2002.
M. Rossi and A. Bozzoli; "Tracking and Counting Moving People;" Proceedings of the International Conference on Image Processing, vol. 3, pp. 212-216, 1994.

* cited by examiner

*Primary Examiner* — Daniel G Mariam
(74) *Attorney, Agent, or Firm* — Canon U.S.A., Inc. IP Division

(57) ABSTRACT

When a subject in a captured image is detected by using a whole search and a local search, a computation cost is reduced by reducing an area on which the whole search is to be performed within the captured image, and degradation in accuracy of counting the number of subjects having passed a line in the captured image is prevented.

12 Claims, 10 Drawing Sheets

FIG.10

INFORMATION PROCESSING APPARATUS, CONTROL METHOD, AND STORAGE MEDIUM

BACKGROUND OF THE INVENTION

Field of the Invention

The present invention relates to an information processing apparatus that detects a subject, a control method, and a storage medium.

Description of the Related Art

Conventionally, a technique for analyzing an image and detecting a subject within the image is known. Moreover, a technique for performing subject detection processing on a plurality of images that are continuous in chronological order to track a subject is known. Further, a pass count technique for counting the number of subjects having passed a line based on a subject tracking result and a position of the line set within an image is known (hereinafter, the line is referred to as a pass count line).

In general, a computation cost of the subject detection processing is high. Accordingly, a technique for reducing the computation cost by narrowing an area in which the subject detection processing is to be performed is known. The use of such a technique shortens detection processing time.

In a non-patent document entitled "High Speed Massive People Counting Video Content Analysis Software", by T. Futagi, et al. *Image Laboratory*. Vol. 28(3), pp. 53-57 (March 2017), first, an image is acquired from an image capturing apparatus, and then, detection processing using a feature quantity of a subject is performed on the entire image. For example, matching is performed while the entire image is scanned using a patch image formed into a human shape (hereinafter, such processing is referred to as a whole search). At the end of the first whole search, a next image (e.g., an image corresponding to a next frame) is acquired from the image capturing apparatus, and another whole search is executed. Herein, concurrently with a start of the second whole search, subject detection is locally performed (hereinafter, referred to as a local search) on a periphery of a subject detected by the first whole search in the next image. For example, only the periphery of the subject detected by using the patch image is scanned. At the end of the local search, a next image is acquired from the image capturing apparatus. If the whole search processing being concurrently performed is ended, a further local search is executed on the periphery of the subject detected by the whole search. On the other hand, if the whole search being concurrently performed is not ended, a local search is executed on the periphery of the subject detected by the local search.

According to the non-patent document entitled "High Speed Massive People Counting Video Content Analysis Software", by T. Futagi, et al. *Image Laboratory*. Vol. 28(3), pp. 53-57 (March 2017), the whole search entailing a higher computation cost than that of the local search and the local search entailing a lower computation cost than that of the whole search are concurrently executed, and a subject detection result of the local search is output. Thus, the subject is tracked while subject detection processing time for each image is shorten.

However, in the technique discussed in the non-patent document entitled "High Speed Massive People Counting Video Content Analysis Software", by T. Futagi, et al. *Image Laboratory*. Vol. 28(3), pp. 53-57 (March 2017), as whole search processing time (processing time mainly for which matching is performed while scanning is performed using a patch image) becomes long, a length of time until detection of a new subject is performed becomes long. Consequently, the subject may pass through the pass count line before the whole search ends. In such a case, the pass counting of the subject is more likely to fail.

SUMMARY OF THE INVENTION

The present invention is directed to reduction of whole search processing time to prevent degradation in pass count accuracy due to passage of a subject to be detected through a line before completion of scan processing for a whole search.

According to an aspect of the present invention, an information processing apparatus includes an acquisition unit configured to acquire a captured image, a first setting unit configured to set a first detection area for detection of a subject to the captured image, a second setting unit configured to set a second detection area for detection of a new subject, the second detection area including at least a portion of an end of the first detection area set by the first setting unit, and a detection unit configured to detect the new subject in the second detection area set by the second detection unit and execute a local search based on the new subject.

Further features of the present invention will become apparent from the following description of exemplary embodiments with reference to the attached drawings.

DESCRIPTION OF THE EMBODIMENTS

Hereinafter, exemplary embodiments are described with reference to the drawings. In each of the exemplary embodiments, whole search processing and local search processing are concurrently executed to perform tracking processing, and pass count processing is achieved, similar to the processing discussed in the non-patent document entitled "High Speed Massive People Counting Video Content Analysis Software", by T. Futagi, et al. *Image Laboratory*. Vol. 28(3), pp. 53-57 (March 2017).

In the first exemplary embodiment, a system sets a subject detection area to an image acquired from an image capturing apparatus, and sets an area within a certain distance from a vicinity of an end of the detection area as a whole search area. Then, similar to the processing discussed in the non-patent document entitled "High Speed Massive People Counting Video Content Analysis Software", by T. Futagi, et al. *Image Laboratory*. Vol. 28(3), pp. 53-57 (March 2017), the whole search processing and the local search processing are concurrently executed to perform the tracking processing, and the pass count processing is achieved. Hereinafter, processing up to setting of the whole search area in the exemplary embodiment is described.

Figure 1:
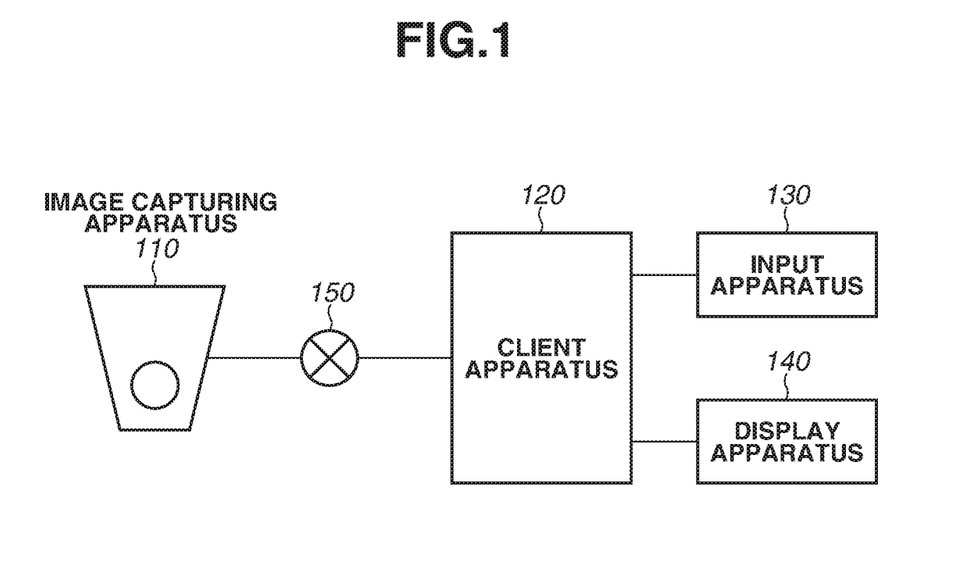
FIG. 1 is a diagram schematically illustrating a configuration of a pass count system.

FIG. 1 is a diagram illustrating one example of a system configuration according to the present exemplary embodiment.

The system of the present exemplary embodiment includes an image capturing apparatus 110 and a client apparatus 120. The image capturing apparatus 110 and the client apparatus 120 are communicably connected with each other via a network 150. The client apparatus 120 is connected with an input apparatus 130 and a display apparatus 140.

The image capturing apparatus 110 such as a network camera captures an image. The client apparatus 120 is an information processing apparatus such as a personal computer, a server apparatus, and a tablet device. The client apparatus 120 drives the image capturing apparatus 110, acquires a captured image, detects a moving object in the acquired image, and superimposes a mask. The input apparatus 130 includes a mouse and a keyboard. The display apparatus 140 such as a monitor displays an image output by the client apparatus 120. In the present exemplary embodiment, the client apparatus 120, the input apparatus 130, and the display apparatus 140 are independent apparatuses. However, for example, the client apparatus 120 and the display apparatus 140 can be integrally provided, or the input apparatus 130 and the display apparatus 140 can be integrally provided. Further, the client apparatus 120, the input apparatus 130, and the display apparatus 140 can be integrally provided.

The network 150 connects the image capturing apparatus 110 with the client apparatus 120. The network 150 includes a plurality of components that satisfy a communication standard, for example, Ethernet®. The plurality of components includes a router, a switch, and a cable. In the present exemplary embodiment, the network 150 of any communication standard, size, and configuration can be employed as long as communication between the image capturing apparatus 110 and the client apparatus 120 can be performed. For example, the network 150 can include the Internet, a wired local area network (wired LAN), a wireless LAN, and a wide area network (WAN).

Figure 2A:
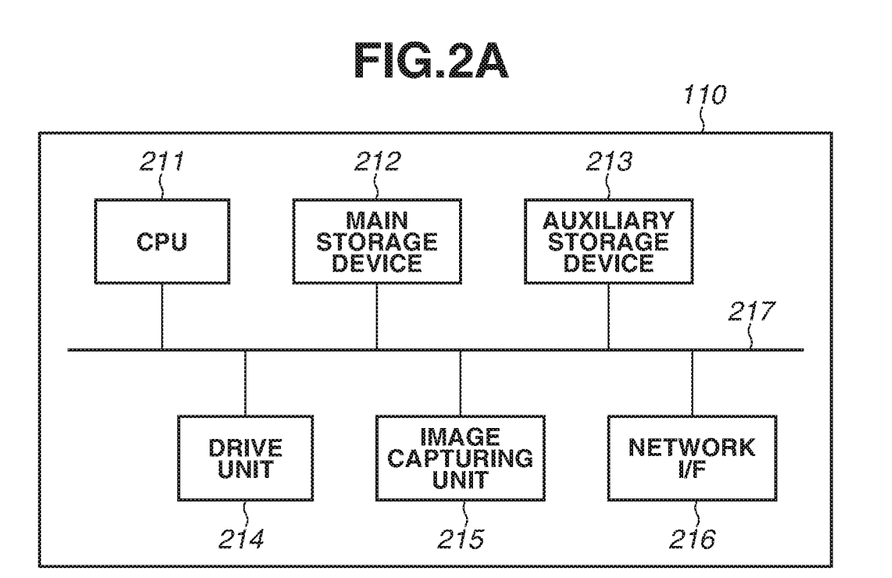
FIGS. 2A and 2B are block diagrams illustrating hardware configurations of respective devices.

FIG. 2A is a diagram illustrating one example of a hardware configuration of the image capturing apparatus 110.

The image capturing apparatus 110 includes a central processing unit (CPU) 211, a main storage device 212, an auxiliary storage device 213, a drive unit 214, an image capturing unit 215, and a network interface (I/F) 216. These components are communicably connected to one another via a system bus 217.

The CPU 211 controls operation of the image capturing apparatus 110. The main storage device 212 is a storage device such as a random access memory (RAM) that functions as a work area and a temporary data storage area of the CPU 211. The auxiliary storage device 213 is a storage device such as a hard disk drive (HDD), a read only memory (ROM), and a solid state drive (SSD). The auxiliary storage device 213 stores various programs and various pieces of setting data.

The drive unit 214 drives the image capturing apparatus 110 and changes an orientation of the image capturing apparatus 110, thereby changing an image capturing direction and an angle of view of the image capturing unit 215. The image capturing unit 215 includes an image capturing element and an optical system to form a subject image on the image capturing element with an intersection point of an optical axis of the optical system and the image capturing element as an image capturing center. The image capturing element includes, for example, a complementary metal-oxide semiconductor (CMOS), and a charge-coupled device (CCD). The network I/F 216 is an interface used for communication with an external device such as the client apparatus 120 via the network 150.

The CPU 211 executes processing based on a program stored in the auxiliary storage device 213, so that a function of the image capturing apparatus 110 described below with reference to FIG. 3A, and processing performed by the image capturing apparatus 110 are implemented.

Figure 2B:
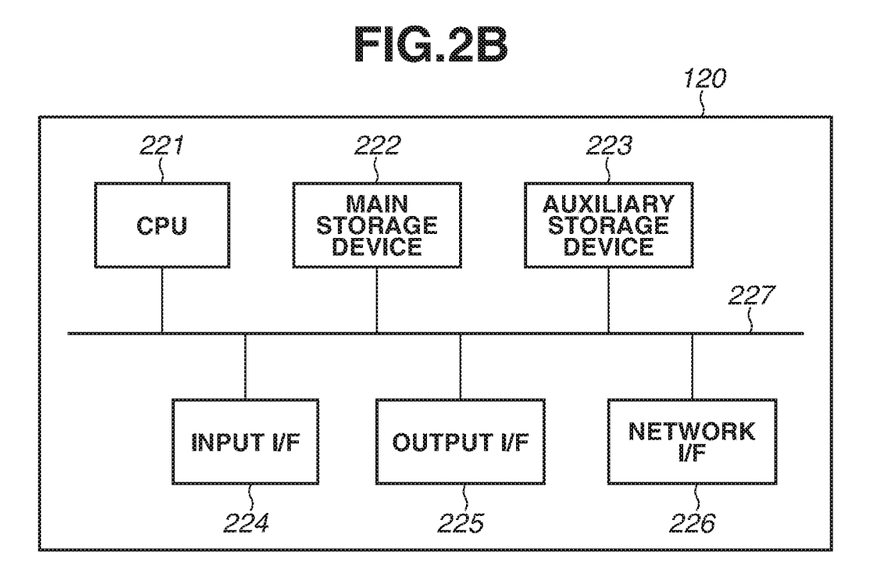

FIG. 2B is a diagram illustrating one example of a hardware configuration of the client apparatus 120.

The client apparatus 120 includes a CPU 221, a main storage device 222, an auxiliary storage device 223, an input I/F 224, an output I/F 225, and a network I/F 226. These components are communicably connected to one another via a system bus 227.

The CPU 221 controls operation of the client apparatus 120. The main storage device 222 is a storage device such as a random access memory (RAM) and that functions as a work area and a temporary data storage area of the CPU 221. The auxiliary storage device 223 is a storage device such as an HDD, a ROM, and an SSD. The auxiliary storage device 223 stores various programs and various pieces of setting data.

The input I/F 224 is an interface used for receiving an input from a device such as the input apparatus 130. The output I/F 225 is an interface used for outputting information to a device such as the display apparatus 140. The network I/F 226 is an interface used for communication with an external device such as the image capturing apparatus 110 via the network 150.

Figure 3B:
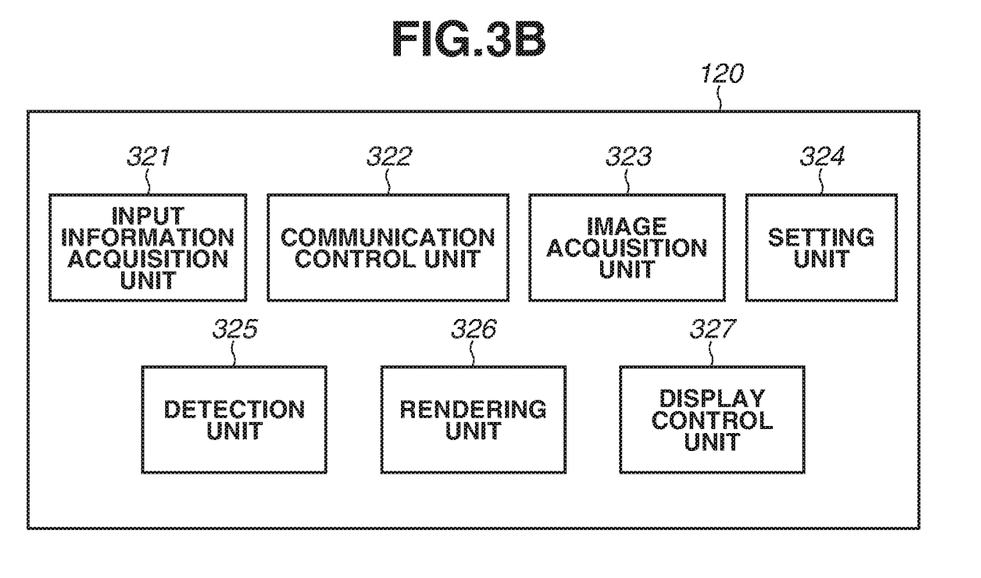
Figure 4:
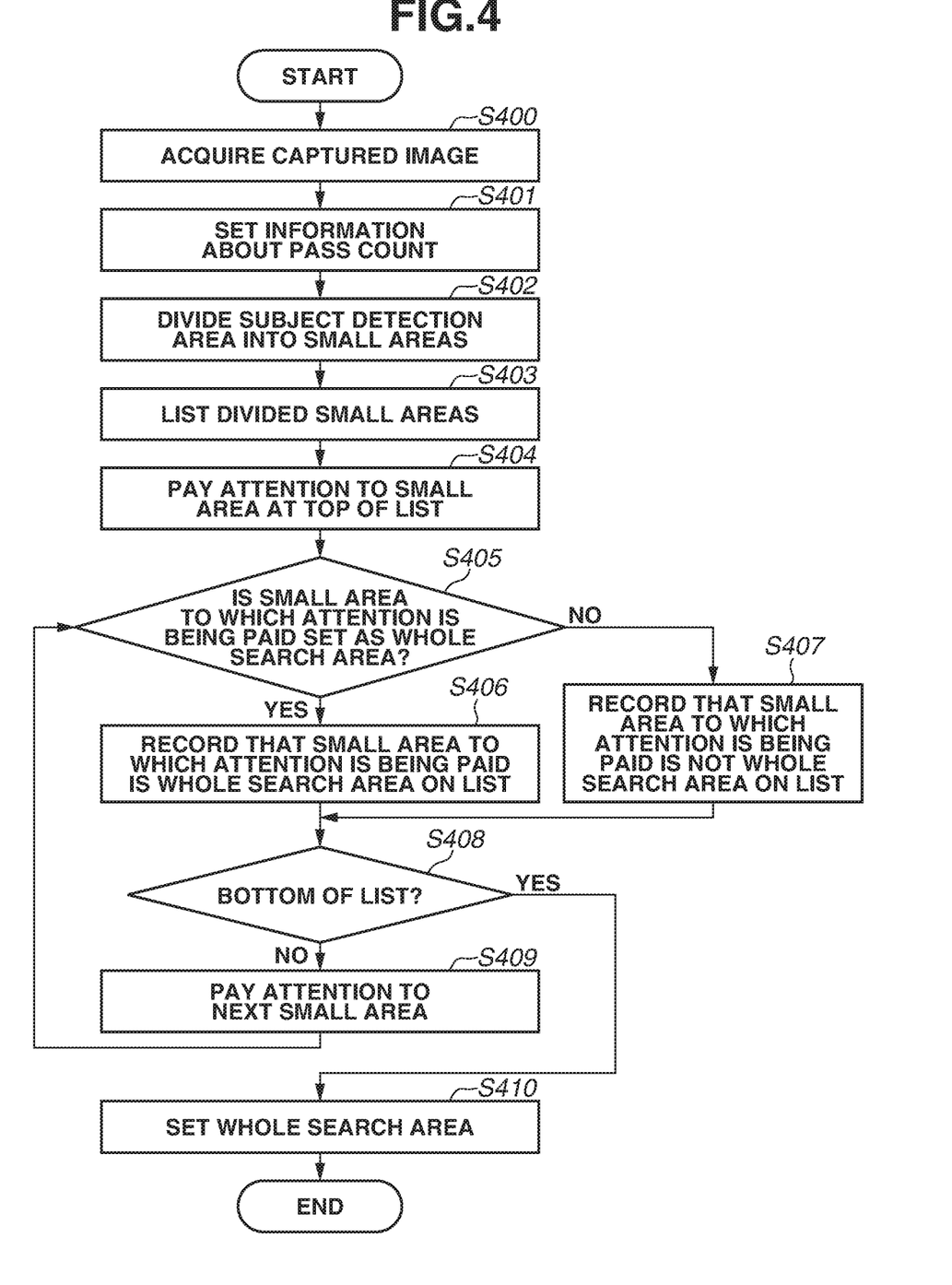
FIG. 4 is a flowchart schematically illustrating search processing.

The CPU 221 executes processing based on a program stored in the auxiliary storage device 223, so that a function of the client apparatus 120, described below with reference to FIG. 3B, and processing performed by the client apparatus 120, described below with reference to a flowchart illustrated in FIG. 4, are implemented.

Figure 3A:
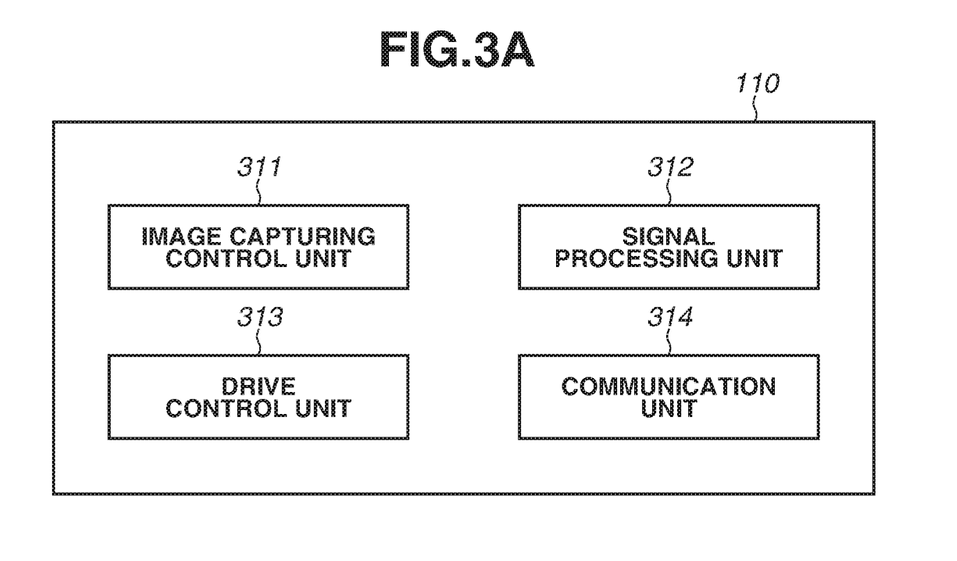
FIGS. 3A and 3B are block diagrams schematically illustrating functional configurations of respective devices.

FIG. 3A is a diagram illustrating one example of a functional configuration of the image capturing apparatus 110.

The image capturing apparatus 110 includes an image capturing control unit 311, a signal processing unit 312, a drive control unit 313, and a communication unit 314.

The image capturing control unit 311 captures an image of a surrounding environment via the image capturing unit 215. The signal processing unit 312 performs image processing on the image captured by the image capturing control unit 311. The signal processing unit 312, for example, encodes the image captured by the image capturing control unit 311. If the image captured by the image capturing control unit 311 is a still image, the signal processing unit 312 encodes the image by using a coding method such as Joint Photographic Experts Group (JPEG). If the image captured by the image capturing control unit 311 is a moving image, the signal processing unit 312 encodes the image by using a coding method such as H.264/Moving Picture Experts Group phase-4 Advanced Video Coding (MPEG-4 AVC) (hereinafter, referred to as H. 264), and High Efficiency Video Coding (HEVC). Moreover, the signal processing unit 312 can also encode the image, for example, by using a coding method selected by a user from among a plurality of predetermined coding methods via an operation unit of the image capturing apparatus 110.

The drive control unit 313 performs control to change an image capturing direction and an angle of view of the image capturing control unit 311 via the drive unit 214. However, the drive control unit 313 may also change either the image capturing direction or the angle of view of the image capturing control unit 311. Alternatively, the image capturing direction and the angle of view of the image capturing control unit 311 may also be fixed. The communication unit 314 transmits the image that has been captured by the image capturing control unit 311 and processed by the signal processing unit 312 to the client apparatus 120 via the network I/F 216. Moreover, the communication unit 314 receives a control instruction to be given to the image capturing apparatus 110 from the client apparatus 120 via the network I/F 216.

FIG. 3B is a diagram illustrating one example of a functional configuration of the client apparatus 120.

The client apparatus 120 includes an input information acquisition unit 321, a communication control unit 322, an image acquisition unit 323, a setting unit 324, a detection unit 325, a rendering unit 326, and a display control unit 327.

The input information acquisition unit 321 receives an input from a user via the input apparatus 130. The communication control unit 322 receives an image transmitted from the image capturing apparatus 110 via the network 150. Moreover, the communication control unit 322 transmits a control instruction to the image capturing apparatus 110 via the network 150. The image acquisition unit 323 acquires the image captured by the image capturing apparatus 110 as an image on which subject detection processing is to be performed from the image capturing apparatus 110 via the communication control unit 322. Alternatively, the image acquisition unit 323 may acquire an image stored in the auxiliary storage device 223 as an image on which the subject detection processing is to be performed. The setting unit 324 sets, in the image acquired by the image acquisition unit 323, an area (first detection area) in which a subject is to be detected, a pass count line (detection line), and a whole search area (second detection area). The detection unit 325 performs, on the image acquired by the image acquisition unit 323, a whole search and a local search to track the subject. Moreover, the detection unit 325 performs subject pass count processing based on a subject tracking result and a position of the above-described pass count line. The rendering unit 326 superimposes the detection area set by the setting unit 324 (the first detection area set by a first setting unit), the whole search area (the second detection area set by a second setting unit), and the pass count line on the captured image. Moreover, the rendering unit 326 superimposes the subject detected by the detection unit 325 on the captured image. The display control unit 327 outputs the captured image on which the subject detection result has been superimposed to the display apparatus 140 based on an instruction from the CPU 221.

Figure 10:
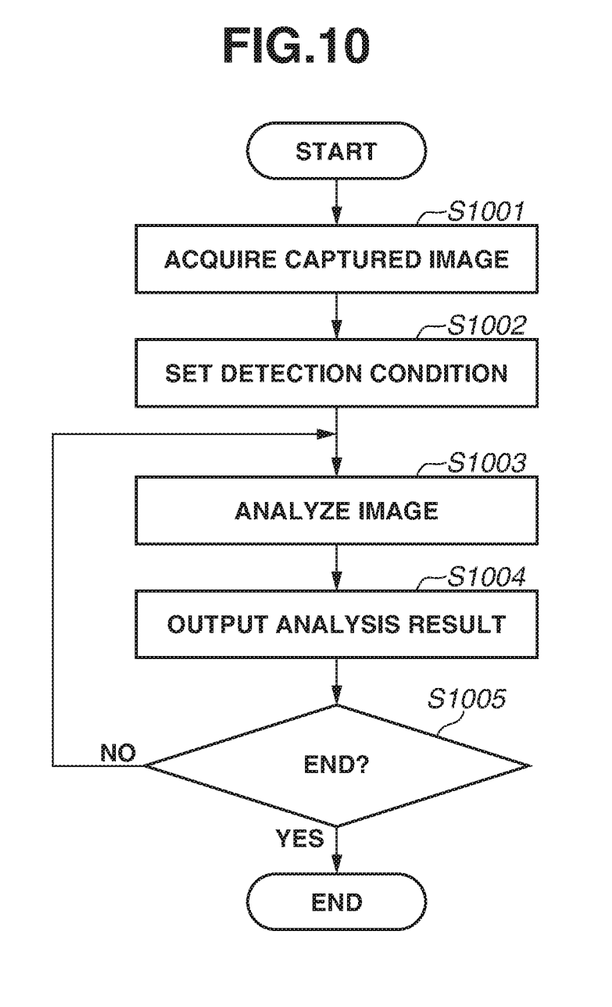
FIG. 10 is a flowchart schematically illustrating pass count processing.

FIG. 10 is a flowchart schematically illustrating pass count processing performed by the client apparatus 120 according to the present exemplary embodiment. In step S1001, the communication control unit 322 and the image acquisition unit 323 acquire a captured image from the image capturing apparatus 110. In step S1002, the input information acquisition unit 321 or the setting unit 324 sets a detection area based on an instruction (first detection area instruction) from a user. In step S1003, the detection unit 325 executes whole search processing, local search processing, tracking processing, and detection line pass detection processing based on the setting provided in step S1002 on a captured image newly acquired by the image acquisition unit 323.

The detection unit 325 performs detection processing using a feature quantity of a subject on an area designated by the user. Herein, matching is performed while a second detection area is scanned using a patch image formed into a human shape. At the end of the whole search on the second detection area, the detection unit 325 acquires an image in a next frame (next-frame image) from the image capturing apparatus 110, and executes a local search on the vicinity of a new subject detected from the second detection area to track the subject. The detection unit 325 detects, by tracking the subject, passage of the subject when the subject crosses the detection line.

In step S1004, the rendering unit 326 and the display control unit 327 display the number of detected passage counts on a screen of the display apparatus 140. In step S1005, the CPU 221 determines whether to finish the pass count processing. If the CPU 221 determines not to finish the pass count processing (NO in step S1005), the processing proceeds to step S1003. If the CPU 221 determines to finish the pass count processing (YES in step S1005), the processing ends. Here, the determination is made based on whether a pass count processing end instruction has been issued by the user or whether an image analysis mode has ended.

FIG. 4 is a flowchart illustrating whole search area setting processing. With reference to the flowchart in FIG. 4, a description is given of processing up to where the client apparatus 120 acquires an image and sets a whole search area in the acquired image.

In step S400, the setting unit 324 acquires an image captured by the image capturing apparatus 110 from the image capturing apparatus 110 via the communication control unit 322. Hereinafter, the image captured by the image capturing apparatus 110 and acquired in step S400 is referred to as a captured image.

Figure 5:
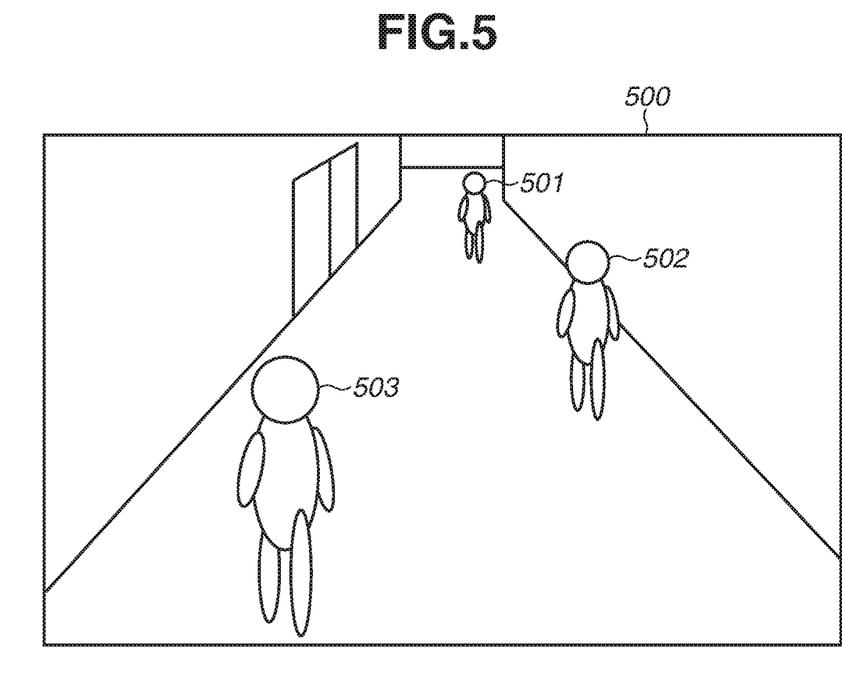
FIG. 5 is a diagram schematically illustrating one example of a captured image.

FIG. 5 is a diagram illustrating one example of a captured image that is captured by the image capturing apparatus 110. In FIG. 5, an image 500 represents the captured image that is captured by the image capturing apparatus 110. Subjects 501 to 503 represent pass count targets in an environment in the image 500.

In step S401, the setting unit 324 sets a subject detection area and a pass count line to the captured image. In the present exemplary embodiment, the system displays the captured image to the user via the display apparatus 140, and sets the subject detection area and the pass count line based on an input from the user on the captured image.

Figure 6:
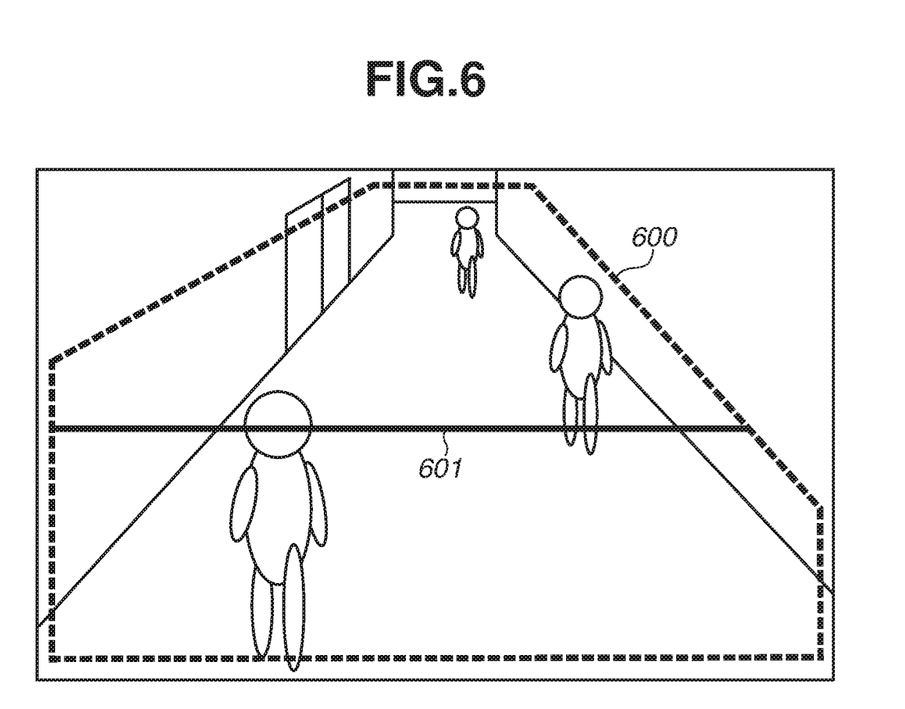
FIG. 6 is a diagram in which a subject detection area and a pass count line are superimposed on the captured image illustrated in FIG. 5.

FIG. 6 is a diagram illustrating an example of the subject detection area and the pass count line set by the setting unit 324. In FIG. 6, an area 600 indicates the subject detection area set to the image 500 by the setting unit 324. Moreover, a solid line 601 indicates the pass count line set by the setting unit 324 to the image 500.

In step S402, the setting unit 324 divides the subject detection area into small areas having any size. In the present exemplary embodiment, the small area is set to be one pixel in the image. However, the small area is not limited thereto. For example, the small area may be a rectangle having any size. The small area may also be created by using an image area segmentation algorithm such as a super pixel. Then, in step S403, the setting unit 324 manages the divided small areas in a list form.

In step S404, the setting unit 324 pays attention to the small area at the top of the list.

In step S405, the setting unit 324 determines whether to set the small area to which the attention is being paid as a whole search area. In the present exemplary embodiment, the setting unit 324 determines whether the small area is the whole search area based on a distance from an end of the detection area. The specific processing flow is as below.
1) Draw a perpendicular line from a centroid of the small area to each side of the detection area, and calculate a length of each perpendicular line.
2) Select the shortest perpendicular line.
3) If a length of the selected perpendicular line is a threshold value or less (YES in step S405), the setting unit 324 determines that the small area to which the attention is being paid is the whole search area, and the processing proceeds to step S406. On the other hand, if the length of the selected perpendicular line is greater than a threshold value (NO in step S405), the setting unit 324 determines that the small area to which the attention is being paid is not the whole search area, and the processing proceeds to step S407.

The present exemplary embodiment is described using an example in which the aforementioned threshold value is obtained by the client apparatus 120 receiving input from the user, but the way of obtaining the threshold value is not limited thereto. For example, the client apparatus 120 may receive, from the image capturing apparatus 110, a moving image constituted of several frames in which a subject is captured. In such a case, the whole search is performed on each detection area in the moving image, and the pass count processing is executed on the detected subject. Subsequently, the whole search and the local search are concurrently executed while changing the aforementioned threshold value, and the pass count processing is executed. At this time, a minimum value can be selected from among threshold values that provide the same pass count result as a case where pass counting is performed using only the whole search.

In step S406, the setting unit 324 records, on the list, that the small area to which the attention is being paid is the whole search area.

In step S407, the setting unit 324 records, on the list, that the small area to which the attention is being paid is not the whole search area.

In step S408, the setting unit 324 determines whether attention is being paid to the bottom of the list. If the setting unit 324 determines that the attention is being paid to the bottom of the list (YES in step S408), the processing proceeds to step S410. If the setting unit 324 determines that the attention is not being paid to the bottom of the list (NO in step S408), the processing proceeds to step S409.

In step S409, the setting unit 324 pays attention to a next small area, and the processing proceeds to step S405.

In step S410, based on information about whether each of the small areas stored on the small area list is the whole search area, the setting unit 324 sets a whole search area to the captured image.

Figure 7:
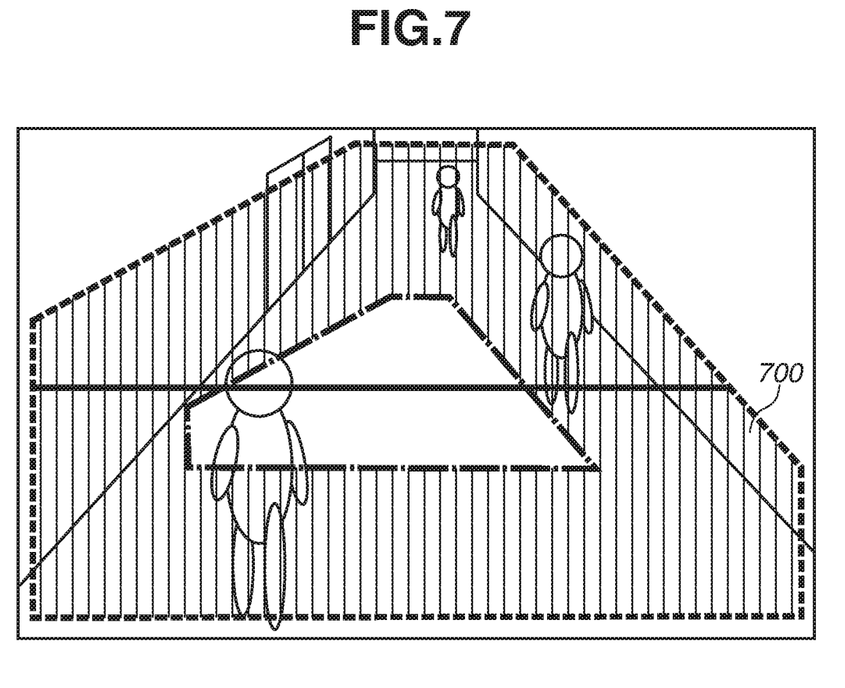
FIG. 7 is a diagram in which a whole search area is superimposed on a vicinity of an end of the subject detection area.

FIG. 7 illustrates an example of the whole search area set in step S410 of the flowchart in FIG. 4 according to the present exemplary embodiment.

In FIG. 7, an area 700 surrounded by a dotted line and a dashed line is the whole search area that is set in step S410 to the image 500.

In the present exemplary embodiment, the whole search is executed in the area 700 (second detection area) and the local search is executed in the area 600 (the first detection area) to perform the tracking processing, whereby the pass count processing is achieved. Accordingly, a computation cost can be reduced compared to a case where the whole search and the local search are concurrently executed uniformly in the area 600.

In the first exemplary embodiment described above, the area within a certain distance from the vicinity of the end of the detection area is set as the whole search area, so that the computation cost of the pass count processing is reduced. However, in a case where there is a bias in a direction in which passage is counted, the whole search area can be further reduced compared to the whole search area set in the first exemplary embodiment while preventing degradation in pass count accuracy. For example, in the image 500, the subjects are moving in a vertical direction, and the pass count processing counts the passage of the subjects only in the vertical direction. In this case, a new subject appears from either an upper end or a lower end of the detection area and not from a left end or a right end of the detection area. Accordingly, a whole search area for detection of the new subject can be the upper and lower ends only of the subject detection area, and the left and right ends can be excluded from a target of the whole search.

In a second exemplary embodiment, a description is given of a method by which a subject pass direction is determined based on a pass count line set by a user, and a whole search area is set based on the subject pass direction.

Since a configuration of a system and hardware and functional configurations of an image capturing apparatus 110 and a client apparatus 120 of the present exemplary embodiment are similar to those of the first exemplary embodiment, descriptions thereof are omitted.

Moreover, since the processing in steps S400 to S404 and steps S406 to S410 in a flowchart illustrated in FIG. 4 in the present exemplary embodiment is similar to that described in the first exemplary embodiment, a description thereof is omitted. The present exemplary embodiment differs from the first exemplary embodiment in a method for determining whether a small area to which attention is being paid is a whole search area in step S405 illustrated in FIG. 4. In the present exemplary embodiment, a setting unit 324 determines whether to set the small area to which the attention is being paid as a whole search area based on a position of the pass count line and a distance from an end of a detection area. The specific processing is as below.
1) Draw a perpendicular line from a centroid of the small area to which the attention is being paid to each side of the detection area, and calculate a length of each perpendicular line.
2) Select the shortest perpendicular line.
3) Draw a perpendicular line from the centroid of the small area to which the attention is being paid to the pass count line, and calculate a length of the perpendicular line.
4) If a length of the perpendicular line to the side of the detection area is a threshold value or less, and a length of the perpendicular line to the pass count line is a threshold value or more, the setting unit 324 determines that the small area to which the attention is being paid is the whole search area, and the processing proceeds to step S406. On the other hand, if the length of the perpendicular line is greater than the threshold value, the setting unit 324 determines that the small area to which the attention is being paid is not the whole search area, and the processing proceeds to step S407.

In the present exemplary embodiment, the aforementioned two threshold values are specified by a user; however, the way of specifying the threshold values is not limited thereto. For example, a moving image including several frames in which subjects who pass by are captured is received from the image capturing apparatus 110, a whole search is performed on each detection area of the moving image, and pass count processing is executed on the detected subject. Subsequently, a whole search and a local search are concurrently executed while changing the aforementioned two threshold values, and pass count processing is executed. Here, from among threshold values that provide the same pass count result as a case where pass counting is performed using only the whole search, a minimum value can be selected as the threshold value for the perpendicular line from the small area to which the attention is being paid to the side of the subject detection area, and a maximum value can be selected as a threshold value for the perpendicular line from the small area to which the attention is being paid to the pass count line.

Figure 8:
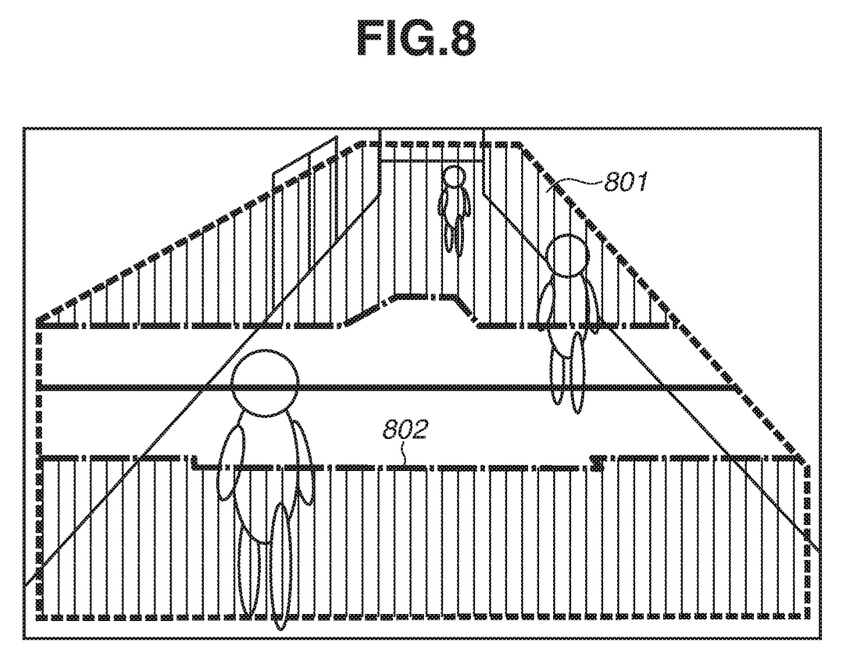
FIG. 8 is a diagram in which a whole search area is superimposed on a vicinity of an end of the subject detection area in consideration of a shape of the pass count line.

FIG. 8 illustrates an example of the whole search area set in step S410 according to the present exemplary embodiment.

In FIG. 8, areas 801 and 802 each surrounded by a dotted line and a dashed line are whole search areas set in step S410 to the image 500 illustrated in FIG. 5.

In the present exemplary embodiment, a whole search is executed on the areas 801 and 802, a local search is executed on the area 600 to perform tracking processing, whereby the pass count processing is achieved. Accordingly, the pass count processing can be implemented on the area 600 while lowering a computation cost compared to that in the first exemplary embodiment.

In the present exemplary embodiment, the method for reducing the computation cost has been described using an example of an environment in which a subject passes in the vertical direction; however, the environment is not limited thereto. The present exemplary embodiment can also be applied to an environment in which the subject passes in a horizontal direction or an oblique direction.

In the first exemplary embodiment described above, the area within a certain distance from the vicinity of the end of the detection area is set as the whole search area. In the second exemplary embodiment described above, the area apart from the pass count line by a certain distance or more and within a certain distance or less from the vicinity of the end of the detection area is set as the whole search area. However, the exemplary embodiments are not limited thereto. The whole search area may also be set by a manual operation performed by a user. In a third exemplary embodiment, a description is given of a method for setting a subject detection area, a pass count line, and a whole search area based on the manual operation performed by the user.

A system displays a live image captured by an image capturing apparatus 110 to a user via a display apparatus 140.

Figure 9:
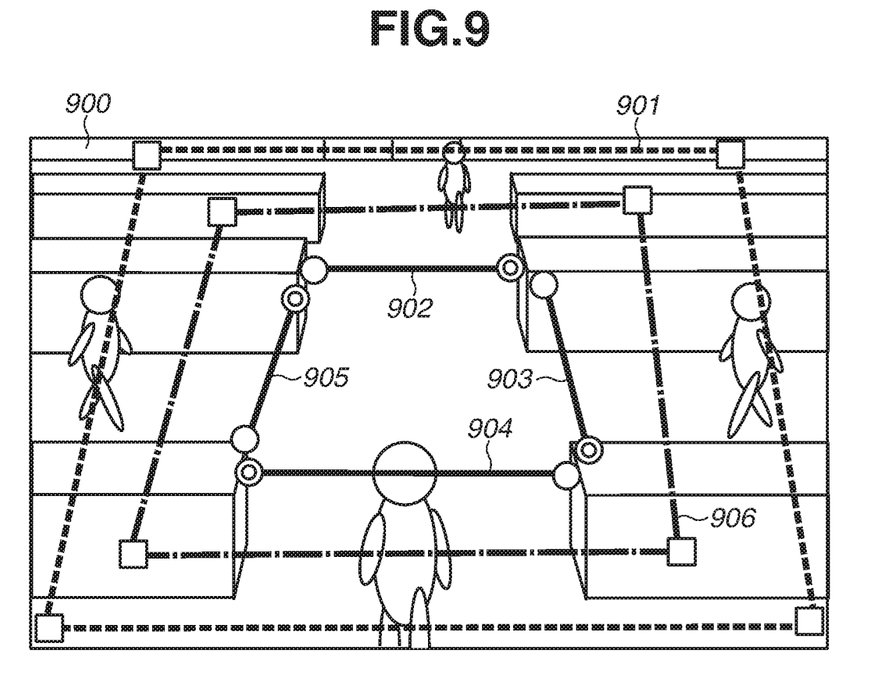
FIG. 9 is a diagram illustrating an operation user interface (UI) for the subject detection area, the pass count line, and a boundary between the whole search area and a local search area.

FIG. 9 illustrates an operation user interface (UI) for setting the subject detection area, the pass count line, and the whole search area. In FIG. 9, the live image captured by the image capturing apparatus 110 is displayed in a captured image display area 900. In the present exemplary embodiment, a video image is displayed in the captured image display area 900. However, the image to be displayed is not limited thereto and may also be a still image. In the present exemplary embodiment, as illustrated in FIG. 9, a description is given of a method for setting the whole search area in an environment in which a subject passes in vertical and horizontal directions. In FIG. 9, a dotted line 901 indicates an area in which a subject is to be detected. A rectangle that overlaps each vertex of the subject detection area is a manipulator of the subject detection area. The user drags the manipulator, so that a shape of the subject detection area can be changed. Moreover, in the present exemplary embodiment, the user can drag a side of the subject detection area to add a vertex to the subject detection area. In addition, in the present exemplary embodiment, the user can right-click on the vertex of the subject detection area to delete the vertex. However, the way of deleting the vertex is not limited to thereto. The user may also double-click on the vertex. For example, if the user performs an operation on a tablet device, the user can double-tap or tap-hold the vertex.

In FIG. 9, solid lines 902 to 905 indicate the pass count lines. A circle that overlaps an end of the pass count line indicates a start point of the pass count line, and a double circle indicates an end point of the pass count line. In the present exemplary embodiment, the start point and the end point are displayed to make a distinction between IN and OUT of the pass count line for the user. However, the way of making the distinction is not limited thereto. For example, an arrow may be displayed on the pass count line so as to be perpendicular to the pass count line. In such a case, it may be presented to a user that passing of a subject in a direction from a shaft of the arrow toward a tip of the arrow is counted as IN and passing of a subject in a reverse direction is counted as OUT. Further, each of the aforementioned circle and the double circle also serves as a manipulator of the pass count line. The user can drag the circle and the double circle to change a shape of the pass count line.

In FIG. 9, a dashed line 906 represents a boundary between the whole search area and the local search area. An area inside a polygon indicated by the dashed line 906 is the local search area. An area outside the polygon indicated by the dashed line 906 and inside the subject detection area is the whole search area. The rectangle that overlaps each of the vertexes of the polygon is the manipulator. If the user drags the manipulator, a shape of the boundary can be changed. In the present exemplary embodiment, a vertex can be added or deleted, similar to the subject detection area.

For example, a functional configuration of the above-described detection system can be partially or entirely implemented as hardware in the image capturing apparatus 110 or the client apparatus 120.

While the exemplary embodiments of the present invention has been described in detail, the present invention is not limited to the disclosed exemplary embodiments. Each of the exemplary embodiments can be arbitrary combined.

According to the above-described exemplary embodiments, it is possible to shorten the whole search processing time and to prevent the degradation in the pass count accuracy due to passage of a subject to be detected through the line before completion of the scan processing for the whole search.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-122422, filed Jun. 27, 2018, which is hereby incorporated by reference herein in its entirety.

What is claimed is:

1. An information processing apparatus comprising:
one or more processors; and
at least one memory storing executable instructions, which when executed by the one or more processors, cause the information processing apparatus to:
acquire a captured image;
set a first area for a first search of a subject in the captured image;
set a second area for a second search of a subject, the second area including at least a portion of an end of the first area;
detect a subject in the second area as the second search;
track the detected subject in the first area or second area, as the first search; and
output a number of tracked subjects which pass a predetermined line,
wherein the second search is a process for detecting the subject by matching a feature of the second area in the captured image with a feature of the subject.

2. The information processing apparatus according to claim 1, wherein only the first search is executed on the first area, and
the second search and/or the first search is executed on the second area.

3. The information processing apparatus according to claim 2, wherein the one or more processors causes the information apparatus to set the predetermined line in the first area.

4. The information processing apparatus according to claim 3, wherein the predetermined line is set by a user.

5. The information processing apparatus according to claim 1, wherein the second area is set based on the predetermined line.

6. The information processing apparatus according to claim 1, wherein the number of the subjects is displayed on a screen.

7. The information processing apparatus according to claim 4, wherein the predetermined line is superimposed on the captured image.

8. A control method for an information processing apparatus, the control method comprising:
acquiring a captured image;
setting a first area for a first search of a subject in the captured image;
setting a second area for a second search of a subject, the second area including at least a portion of an end of the set first area; and
detecting a subject in the second area as the second search;
tracking the detected subject in the first area or second area, as the first search; and
outputting a number of tracked subjects which pass a predetermined line,
wherein the second search is a process for detecting the subject by matching a feature of the second area in the captured image with a feature of the subject.

9. A non-transitory computer-readable medium storing a program for causing a computer to execute a method comprising:
acquiring a captured image;
setting a first area for a first search of a subject to the captured image;
setting a second area for a second search of a subject, the second area including at least a portion of an end of the set first area; and
detecting subject in the second area as the second search;
tracking the detected subject in the first area or second area, as the first search; and
outputting a number of tracked subjects which pass a predetermined line,
wherein the second search is a process for detecting the subject by matching a feature of the second area in the captured image with a feature of the subject.

10. An information processing apparatus comprising:
one or more processors; and
at least one memory storing executable instructions, which when executed by the one or more processors, cause the information processing apparatus to:
acquire a captured image;
set a first area for a first search of a subject in the captured image;
set a second area for a second search of a subject, the second area including at least a portion of an end of the first area;
detect a subject in the second area as the second search;
track the detected subject in the first area or second area, as the first search; and
output a number of tracked subjects which pass a predetermined line;
wherein the second area is a plurality of patches which is decided as a subject of the second search by comparing a threshold value and a length between an end of the first area and a patch divided from the captured image.

11. A control method for an information processing apparatus, the control method comprising:
acquiring a captured image;
setting a first area for a first search of a subject in the captured image;

setting a second area for a second search of a subject, the second area including at least a portion of an end of the set first area; and detecting a subject in the second area as the second search;

tracking the detected subject in the first area or second area, as the first search; and outputting a number of tracked subjects which pass a predetermined line;

wherein the second area is a plurality of patches which is decided as a subject of the second search by comparing a threshold value and a length between an end of the first area and a patch divided from the captured image.

12. A non-transitory computer-readable medium storing a program for causing a computer to execute a method comprising:

acquiring a captured image;

setting a first area for a first search of a subject to the captured image;

setting a second area for a second search of a subject, the second area including at least a portion of an end of the set first area; and detecting subject in the second area as the second search;

tracking the detected subject in the first area or second area, as the first search; and outputting a number of tracked subjects which pass a predetermined line;

wherein the second area is a plurality of patches which is decided as a subject of the second search by comparing a threshold value and a length between an end of the first area and a patch divided from the captured image.

* * * * *